(12) United States Patent
Robert et al.

(10) Patent No.: US 11,220,884 B2
(45) Date of Patent: Jan. 11, 2022

(54) PRESSURE REGULATING CHECK VALVE

(71) Applicant: Halliburton Energy Services, Inc., Houston, TX (US)

(72) Inventors: Ralph Joseph Robert, Spring, TX (US); Louis Francis Lafleur, Spring, TX (US); Clint Adam Brown, Magnolia, TX (US); Paul James, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 506 days.

(21) Appl. No.: 15/775,988

(22) PCT Filed: Dec. 30, 2015

(86) PCT No.: PCT/US2015/067995
§ 371 (c)(1),
(2) Date: May 14, 2018

(87) PCT Pub. No.: WO2017/116427
PCT Pub. Date: Jul. 6, 2017

(65) Prior Publication Data
US 2018/0328142 A1   Nov. 15, 2018

(51) Int. Cl.
*E21B 34/08* (2006.01)
*E21B 37/06* (2006.01)
(Continued)

(52) U.S. Cl.
CPC ............ *E21B 34/08* (2013.01); *E21B 37/06* (2013.01); *E21B 34/101* (2013.01);
(Continued)

(58) Field of Classification Search
CPC ............... F16K 15/026; F16K 1/126; Y10T 137/88062; E21B 34/085; E21B 34/108
(Continued)

(56) References Cited

U.S. PATENT DOCUMENTS 2,356,410 A * 8/1944 Krugler ............. F16K 17/048
137/469
3,016,954 A * 1/1962 Crowell ............. E21B 31/03
166/98

(Continued)

FOREIGN PATENT DOCUMENTS

WO   2005045182   5/2015

OTHER PUBLICATIONS

International Search Report and Written Opinion of PCT Application No. PCT/US2015/067995 dated Sep. 29, 2016: pp. 1-15.

*Primary Examiner* — Kenneth Rinehart
*Assistant Examiner* — Nicole Gardner
(74) *Attorney, Agent, or Firm* — Chamberlain Hrdlicka (57) ABSTRACT

Apparatuses and methods for pressure regulating check valve assemblies are described. In an example, the check valve assembly comprises a housing defining a fluid passage having a fluid inlet side and a fluid outlet side. A first check valve positioned within the fluid passage oriented to restrict fluid flow from the fluid inlet side and a second check valve positioned within the fluid passage oriented to restrict fluid flow from the fluid outlet side. A flow dampener is positioned within the fluid passage and between the first and second check valves.

20 Claims, 6 Drawing Sheets

(51) Int. Cl.
  *E21B 34/10* (2006.01)
  *E21B 43/12* (2006.01)
  *F16K 15/04* (2006.01)

(52) U.S. Cl.
  CPC .......... *E21B 43/123* (2013.01); *F16K 15/044* (2013.01); *F16K 15/048* (2013.01)

(58) Field of Classification Search
  USPC ........................................................ 166/325
  See application file for complete search history.

(56) References Cited

U.S. PATENT DOCUMENTS

| | | | |
|---|---|---|---|
| 3,105,378 A * | 10/1963 | Darling | E21B 47/1025 73/40.5 R |
| 5,707,214 A * | 1/1998 | Schmidt | E21B 43/123 166/320 |
| 6,148,920 A | 11/2000 | McCalvin | |
| 6,932,581 B2 * | 8/2005 | Messick | E21B 43/123 417/54 |
| 8,162,060 B2 * | 4/2012 | Randazzo | E21B 43/123 137/155 |
| 9,010,353 B2 * | 4/2015 | Salihbegovic | E21B 43/123 137/155 |
| 2004/0040718 A1 | 3/2004 | Rhodes et al. | |
| 2007/0227739 A1 * | 10/2007 | Becker | E21B 43/123 166/319 |
| 2012/0186662 A1 * | 7/2012 | De Almeida | E21B 43/123 137/155 |
| 2013/0087343 A1 | 4/2013 | Juenke | |
| 2013/0180592 A1 | 7/2013 | He et al. | |
| 2014/0034326 A1 | 7/2013 | Mahmoud et al. | |

\* cited by examiner

PRESSURE REGULATING CHECK VALVE

BACKGROUND

The exploration and production of hydrocarbons sometimes involves chemically treating portions of well systems, for example, to enhance production, to prevent corrosion of equipment inserted into well systems, or to address deposit build-up issues in production tubing. In some cases, a control line can be run from the surface to an injection point to inject chemicals downhole into production tubing. Flow control valves can be used in these chemical injection systems to control fluid flow between the control line and production tubing. For example, a check valve that opens at a specific pressure prevents fluid in the production tubing from flowing into the control line should downhole pressure exceed pressure in the control line.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, and electrical changes may be made to these embodiments. The various embodiments are not necessarily mutually exclusive, as some embodiments can be combined with one or more other embodiments to form new embodiments. The following detailed description is, therefore, not to be taken in a limiting sense. Flow control valves are used in the chemical injection systems to control fluid flow between the control line and production tubing. For example, a check valve that opens at a specific pressure prevents fluid in the production tubing from flowing into the control line should downhole pressure exceed pressure in the control line. Pressure can be applied from the surface to overcome a cracking pressure of the check valve. In real world applications, however, the check valve can sometimes open when pressure in the production tubing decrease relative to pressure in the control line, causing a negative pressure differential. This creates a vacuum in the control line, which can lead to unwanted leakage of fluid out of the control line and into the production tubing. The existence of the vacuum can change properties of the fluid and cause damage to the control line or check valve. In addition, immediate pressure drops as the check valve opens due to the vacuum can cause the check valve to open and close repeatedly, damaging the sealing surface of the valve. The following provides one or more solutions to this problem, such as by providing an apparatus and method for using an anti-vacuum, pressure regulating check valve assembly.

For example, apparatus and methods are described with respect to using check valve assemblies for regulating fluid flow and pressure in chemical injection systems. In some embodiments, the check valve assembly comprises a housing defining a fluid passage having a fluid inlet side and a fluid outlet side. A first check valve positioned within the fluid passage oriented to restrict fluid flow from the fluid inlet side and a second check valve positioned within the fluid passage oriented to restrict fluid flow from the fluid outlet side. A flow dampener positioned within the fluid passage and between the first and second check valves.

In an example, the chemical injection system includes a check valve assembly having a check valve and a lift check valve that actuates in a direction opposite that of the check valve.

Figure 1A:
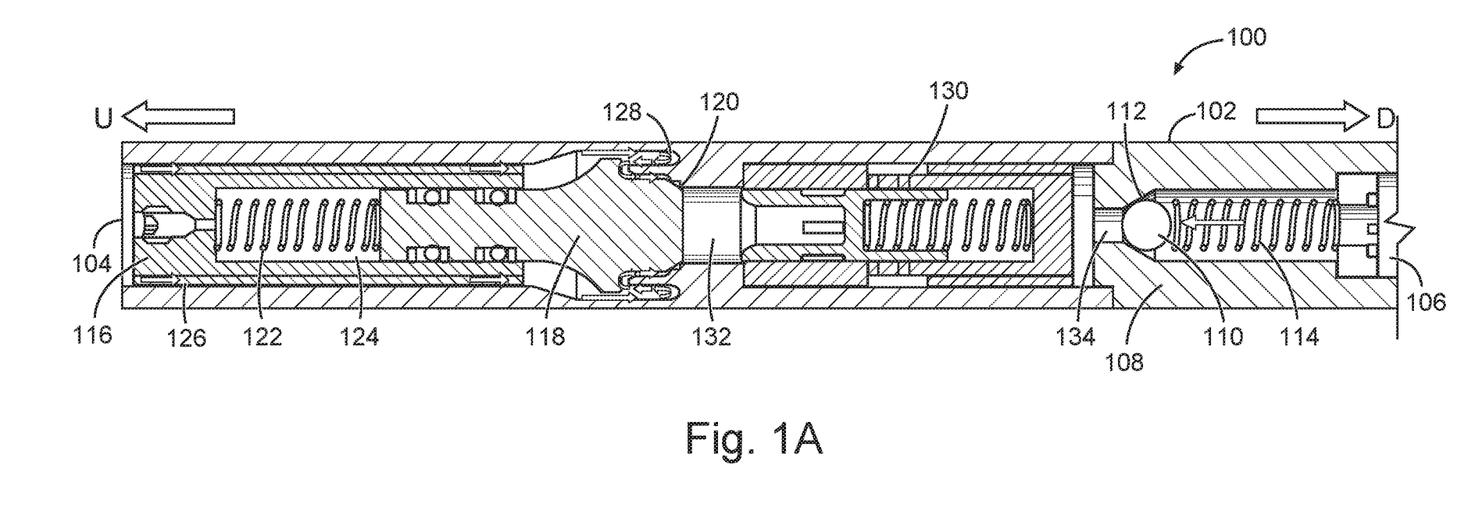
FIG. 1A illustrates a schematic diagram of an example check valve assembly in a closed position, according to various embodiments.

FIG. 1A illustrates a schematic diagram of an example check valve assembly 100 in a closed position; this assembly may be used to control fluid flow in chemical injection systems. As shown, the check valve assembly 100 includes a housing 102 defining a fluid passage having a fluid inlet side 104 and a fluid outlet side 106. In use, the fluid inlet side 104 is oriented in the uphole direction generally indicated by the arrow U; the fluid outlet side 106 is oriented in the downhole direction generally indicated by the arrow D.

The housing 102 includes a check valve 108 positioned within the fluid passage and oriented to restrict fluid flow from the fluid outlet side 106. A closing member 110 of the check valve 108 is pressed against a seat 112 of the check valve 108 by a spring 114. Fluid pressure from downhole direction D and spring force of the spring 114 keeps the check valve 108 closed by biasing the closing member 110 into engagement with the seat 112 until a greater force is exerted upon the closing member 110 from uphole direction U. The pressure at which the check valve 108 begins to open can be referred to as the cracking pressure, representing a minimum upstream pressure (e.g., pressure coming from the uphole direction U) at which the check valve 108 will open. When the cracking pressure is reached, the check valve 108 will open. One of ordinary skill in the art will recognize that check valves can be designed and specified for any specific cracking pressure. It should also be understood that although the check valve 108 is illustrated in this example having a spring-loaded ball, this disclosure is not limited to arrangements in which the closing member is a spherical ball. For example, the closing member can comprise a poppet, a diaphragm, or any other structure suitable for check valves.

The housing 102 further includes a lift check valve 116 positioned within the fluid passage and oriented to restrict fluid flow from the fluid inlet side 104. A closing member 118 of the lift check valve is pressed against seat 120 of the lift check valve 116 by a spring 122. One of ordinary skill in the art will recognize that a lift check valve is a type of check valve where the closing member of the lift check valve "lifts" off its seat by pressure from one side, rather than being pushed off its seat by pressure from the other side. Spring 122 is retained within spring chamber 124 of the lift check valve 116. Spring force of the spring 122 keeps the lift check valve 116 closed by biasing the closing member 118 into engagement with the seat 120 until a greater force is exerted upon the closing member 118 by fluid flow 126 coming from uphole direction U. In this example, the lift check valve 116 also includes a debris collection area 128 where debris from fluid flow 126 accumulates to prevent debris from passing through the lift check valve 116. In the depicted embodiment, the debris collection area 128 is formed as a radial space defined in part by a circumferential surface, allowing fluid communication with fluid flow 126 in the flow passage at a relatively uphole portion of the radial space. In some embodiments, the debris collection area 128 is a U-shaped tubular that is positioned at a localized low point in the flow passage, and thus captures heavy objects or other debris present within fluid flow 126. Solid particulates and debris are retained in the debris collection area 128 while allowing fluid flow 126 to pass to a relatively downhole portion of the radial space towards closing member 118 of the lift check valve 116.

The check valve assembly 100 further includes a flow dampener 130 positioned within the housing 102. In this example, the flow dampener 130 is positioned in the interior of the housing between check valve 108 and lift check valve 116.

Figure 1B:
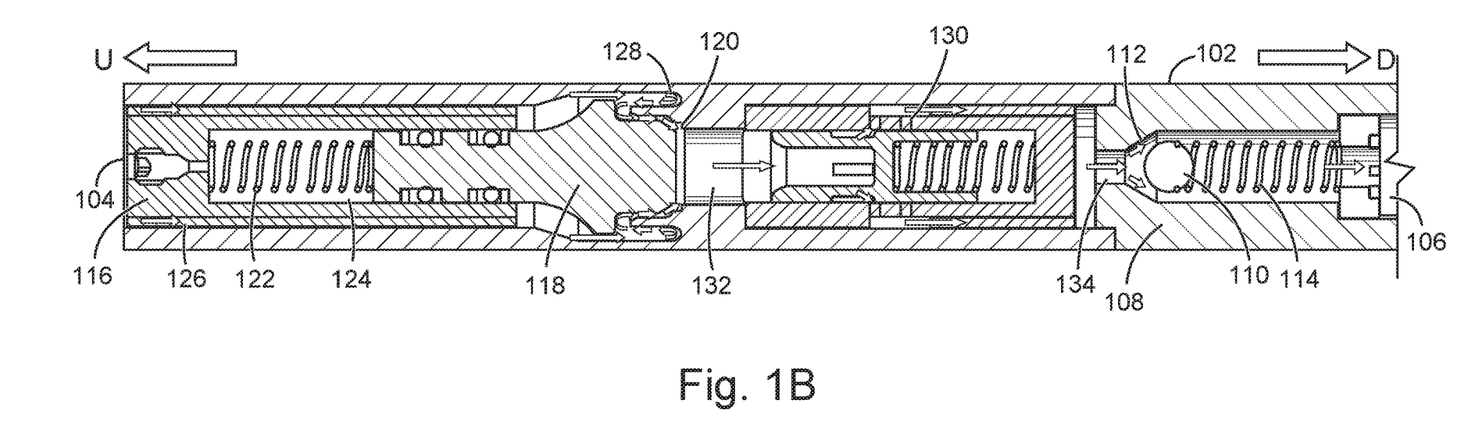
FIG. 1B illustrates a schematic diagram of an example check valve assembly in an open position, according to various embodiments.

FIG. 1B illustrates a schematic diagram of an example check valve assembly 100 in an open position. As shown, pressures associated with fluid flow 126 coming from a control line (not shown) will raise the closing member 118 off seat 120, thereby opening and permitting fluid flow 126 through a fluid passage 132. In other words, pressure from fluid flow 126 actuates closing member 118 in the uphole direction U. The flow dampener 130 prevents an immediate pressure drop from being created as the closing member 118 of the lift check valve 116 opens. Thus, the flow dampener helps prevent opening and closing of the lift check valve 116 in rapid succession and also helps prevent cavitation that would otherwise lead to pitting of the surfaces causing the lift check valve 116 to leak. It should be noted that the cracking pressure of lift check valve 116 is not dependent on any downhole pressures. Thus, the lift check valve 116 should remain closed when a negative pressure differential exists between control line pressure (e.g., experienced at fluid inlet side 104) and production tubing pressure (e.g., experienced at fluid outlet side 106).

Fluid flow 126 through the fluid passage 132 and flow dampener 130 builds pressure until reaching a cracking pressure sufficient to overcome spring force of the spring 114 to push the closing member 110 off seat 112, thereby opening and permitting fluid flow 126 through a fluid passage 134 of the check valve 108. In other words, pressure from fluid flow 126 actuates closing member 110 in the downhole direction D. It should be noted that closing member 110 and closing member 118 actuate in opposite directions relative to each other.

As shown, the check valve 108 prevents flow of fluids in the uphole direction U. For example, even if production tubing pressure at the downhole, fluid outlet side 106 falls below pressures experienced at the uphole, fluid inlet side 104, the check valve 108 can be closed as illustrated in FIG. 1A via spring force. Thus, the check valve assembly 100 should not be prematurely opened merely by the encountering of low downhole pressures. Opening of the check valve assembly 100 requires sufficient pressure to be exerted from the uphole, fluid inlet side 104 to raise the closing member 118 and push closing member 110 off their respective seats. A resulting benefit is that this helps prevent the creation of a vacuum in the control line from negative pressure differentials.

Figure 2A:
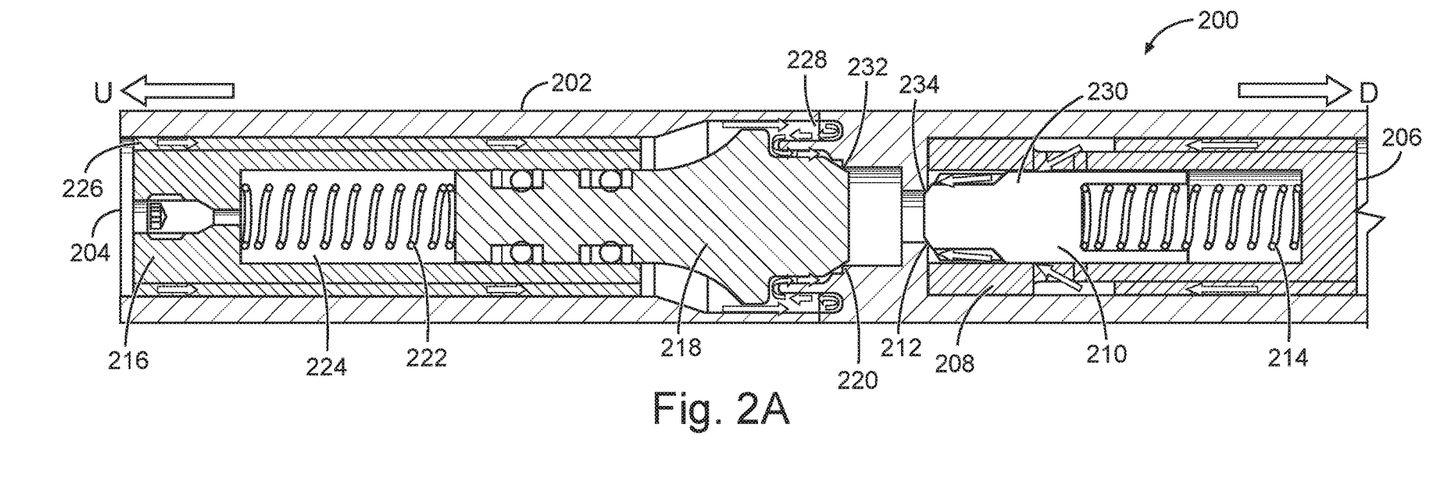
FIG. 2A illustrates a schematic diagram of an example of a check valve assembly in a closed position, according to various embodiments.
Figure 2B:
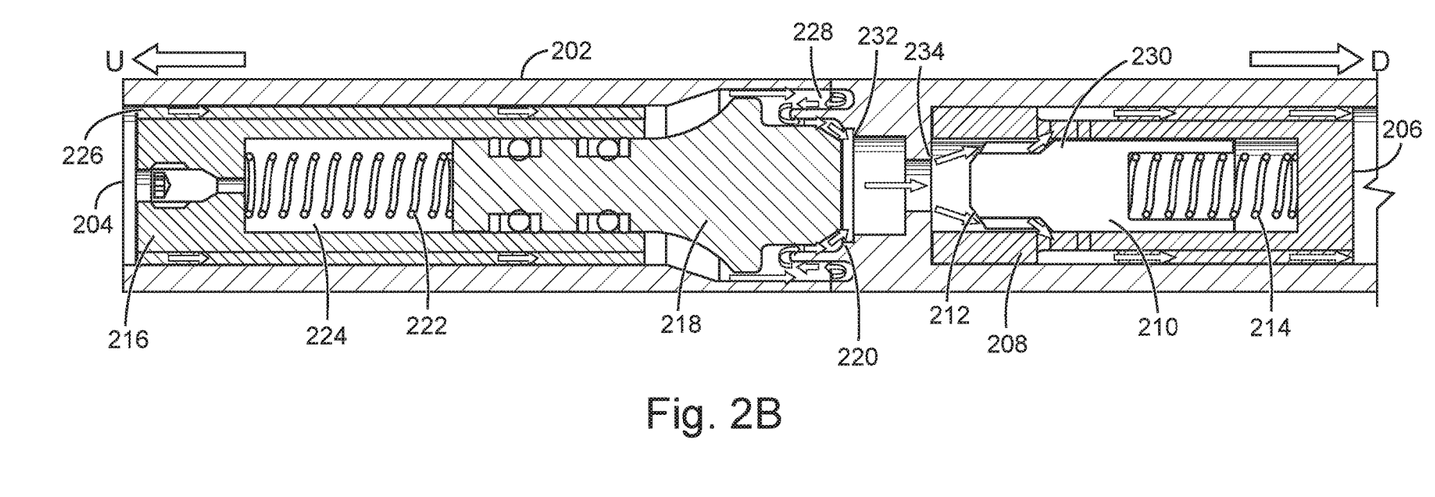
FIG. 2B illustrates a schematic diagram of an example of a check valve assembly in an open position, according to various embodiments.

FIGS. 2A-2B illustrate schematic diagrams of an alternative example of a check valve assembly 200 in a closed and open position, respectively. FIG. 2A illustrates check valve assembly 200 in a closed position, such as to control fluid flow in chemical injection systems. As shown, the check valve assembly 200 includes a housing 202 defining a fluid passage having a fluid inlet side 204 and a fluid outlet side 206. In use, the fluid inlet side 204 is oriented in the uphole direction generally indicated by the arrow U; the fluid outlet side 206 is oriented in the downhole direction generally indicated by the arrow D.

The housing 202 includes a check valve 208 positioned within the fluid passage and oriented to restrict fluid flow from the fluid outlet side 206. A closing member 210 of the check valve 208 is pressed against a seat 212 of the check valve 208 by a spring 214. Fluid pressure from downhole direction D and spring force of the spring 214 keeps the check valve 208 closed by biasing the closing member 210 into engagement with the seat 212 until a greater force is exerted upon the closing member 210 from uphole direction U. When the cracking pressure of check valve 208 is reached, the check valve 208 will open.

The housing 202 further includes a lift check valve 216 positioned within the fluid passage and oriented to restrict fluid flow from the fluid inlet side 204. A closing member 218 of the lift check valve 216 is pressed against seat 220 of the lift check valve 216 by a spring 222. Spring 222 is retained within spring chamber 224 of the lift check valve 216. Spring force of the spring 222 keeps the lift check valve 216 closed by biasing the closing member 218 into engagement with the seat 220 until a greater force is exerted upon the closing member 218 by fluid flow 226 coming from uphole direction U. In this example, the lift check valve 216 also includes a debris collection area 228 where debris from fluid flow 226 accumulates to prevent debris from passing through the lift check valve 216. In the depicted embodiment, the debris collection area 228 is formed as a radial space defined in part by a circumferential surface, allowing fluid communication with fluid flow 226 in the flow passage at a relatively uphole portion of the radial space. In some embodiments, the debris collection area 228 is a U-shaped tubular that is positioned at a localized low point in the flow passage, and thus captures heavy objects or other debris present within fluid flow 226. Solid particulates and debris are retained in the debris collection area 228 while allowing fluid flow 226 to pass to a relatively downhole portion of the radial space towards closing member 218 of the lift check valve 216. The check valve assembly 200 further includes a flow dampener 230 positioned within the housing 202. In this example, the flow dampener 230 is included structurally as a portion of the closing member 210.

FIG. 2B illustrates a schematic diagram of check valve assembly 200 in an open position. As shown, pressures associated with fluid flow 226 coming from a control line (not shown) will raise the closing member 218 off seat 220, thereby opening and permitting fluid flow 226 through a fluid passage 232. In other words, pressure from fluid flow 226 actuates closing member 218 in the uphole direction U. It should be noted that the cracking pressure of lift check valve 216 is not dependent on any downhole pressures. Thus, the lift check valve 216 should not be opened by a negative pressure differential between control line pressure (e.g., experienced at fluid inlet side 204) and production tubing pressure (e.g., experienced at fluid outlet side 206).

Fluid flow 226 through the fluid passage 232 builds pressure until reaching a cracking pressure sufficient to overcome spring force of the spring 214 to push the closing member 210 off seat 212, thereby opening and permitting fluid flow 226 through a fluid passage 234 of the check valve 208. In other words, pressure from fluid flow 226 actuates closing member 210 in the downhole direction D. It should be noted that closing member 210 and closing member 218 actuate in opposite directions relative to each other. Flow dampener 230 regulates the velocity of fluid flow 226 until a continuous flow is attained. This dampening effect of the check valve 208 on the downhole, fluid outlet side 206 prevents an immediate pressure drop from being created as the closing member 218 of the lift check valve 216 opens. Thus, the flow dampener 230 prevents opening and closing of the lift check valve 216 in rapid succession and prevents cavitation that would otherwise lead to pitting of the surfaces causing the lift check valve 216 to leak.

As shown, the check valve 208 prevents flow of fluids in the uphole direction U. For example, even if production tubing pressure at the downhole, fluid outlet side 206 falls below pressures experienced at the uphole, fluid inlet side 204, the check valve 208 can be closed as illustrated in FIG. 1A via spring force. Thus, the check valve assembly 200 should not be prematurely opened when encountering low downhole pressures. Opening of the check valve assembly 200 requires sufficient pressure to be exerted from the uphole, fluid inlet side 204 to raise the closing member 218 and push closing member 210 off their respective seats. A resulting benefit is that this helps prevent the creation of a vacuum in the control line, arising from negative pressure differentials.

Figure 3:
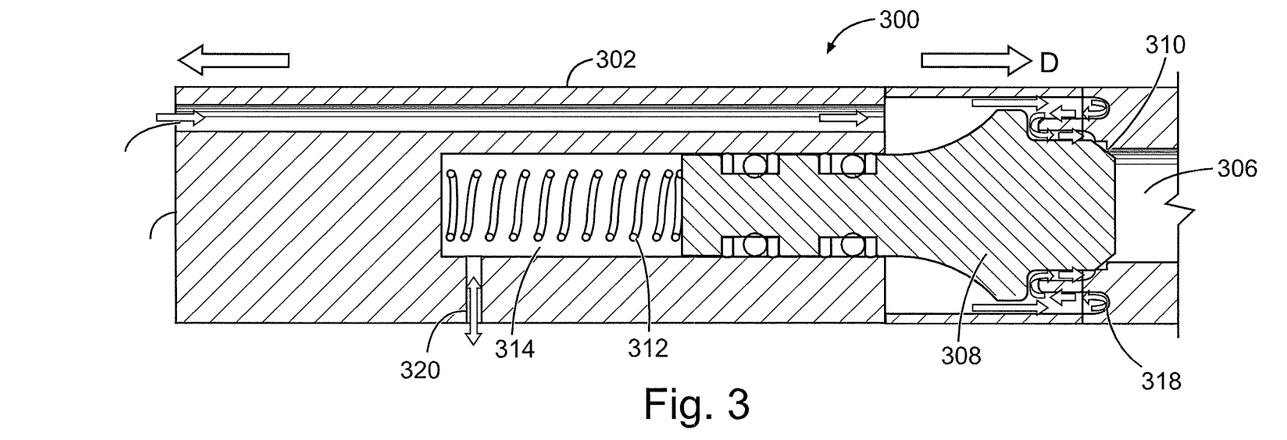
FIG. 3 illustrates a schematic diagram of an alternative example configuration for a lift check valve, according to various embodiments.

FIG. 3 illustrates a schematic diagram of a first example of a lift check valve 300, according to one or more embodiments. The lift check valve 300 can be used in any check valve assembly, such as check valve assemblies 100 and 200 described above. As shown, the lift check valve 300 includes a housing 302 defining a fluid passage having a fluid inlet side 304 and a fluid outlet side 306. In use, the fluid inlet side 304 is oriented in the uphole direction generally indicated by the arrow U; the fluid outlet side 306 is oriented in the downhole direction generally indicated by the arrow D. A closing member 308 of the lift check valve 300 is pressed against seat 310 of the lift check valve 300 by a spring 312. Spring 312 is retained within spring chamber 314 of the lift check valve 300. Spring force of the spring 312 keeps the lift check valve 300 closed by biasing the closing member 308 into engagement with the seat 310 until a greater force is exerted upon the closing member 308 by fluid flow 316 coming from a control line (not shown). In this example, the lift check valve 300 also includes a debris collection area 318 where debris from fluid flow 316 accumulates to prevent debris from passing through the lift check valve 300. In the depicted embodiment, the debris collection area 318 is formed as a radial space defined in part by a circumferential surface, allowing fluid communication with the flow passage at a relatively uphole portion of the radial space. In some embodiments, the debris collection area 318 is a U-shaped tubular that is positioned at a localized low point in the flow passage, and thus captures heavy objects or other debris present within fluid flow. Solid particulates and debris are retained in the debris collection area 318 while allowing fluid flow to pass to a relatively downhole portion of the radial space towards closing member 308 of the lift check valve 300.

In this example, the spring chamber 314 of the lift check valve 300 includes a flow orifice 320 that permits fluid flow out of housing 302 from the spring chamber 314. In use, for example, the spring chamber 314 of the lift check valve 300 can be ported to the annulus between well casing and borehole wall during well production. The spring chamber 314 has a primary and a redundant seal (not shown) separating annulus fluid from fluids within the housing 302. During operation, as the closing member 308 opens, fluid is forced from the spring chamber 314 out of the housing 302 and into the annulus. The flow orifice 320 restricts fluid flow out of the spring chamber 314 according to its size and dampens opening/closing speeds of the closing member 308. Further, pressure in the annulus will also reduce the impact of hydrostatic pressures of the fluid flow 316 on the cracking pressure of the lift check valve 300.

Figure 4:
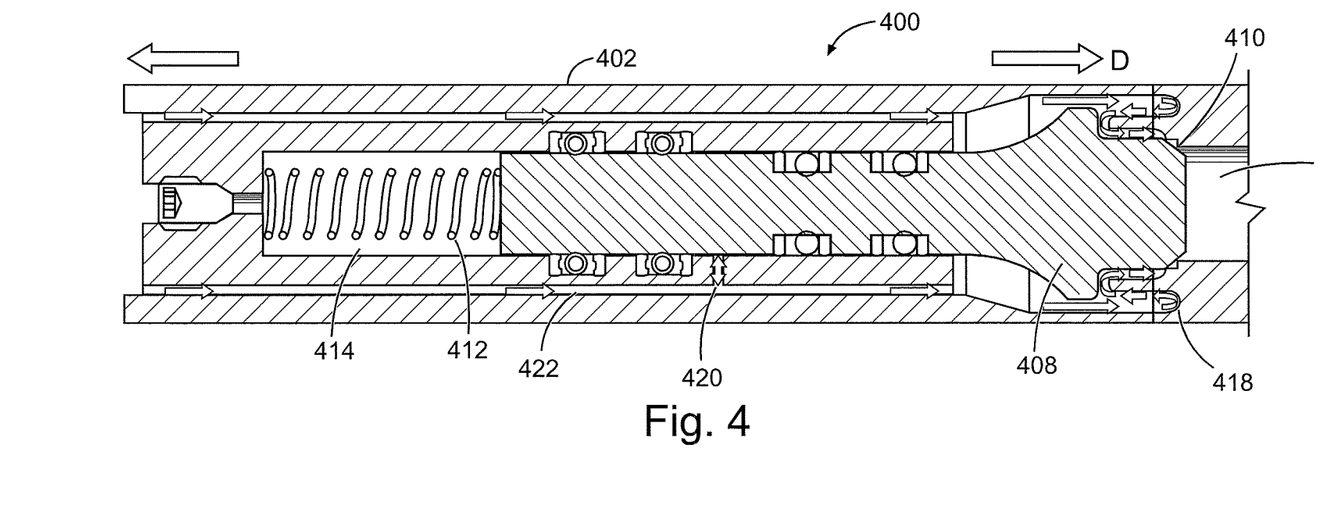
FIG. 4 illustrates a schematic diagram of a second example of a lift check valve, according to various embodiments.

FIG. 4 illustrates a schematic diagram of a second example of a lift check valve 400, according to one or more embodiments. The lift check valve 400 can be used in any check valve assembly, such as check valve assemblies 100 and 200 described above. As shown, the lift check valve 400 includes a housing 402 defining a fluid passage having a fluid inlet side 404 and a fluid outlet side 406. In use, the fluid inlet side 404 is oriented in the uphole direction generally indicated by the arrow U; the fluid outlet side 406 is oriented in the downhole direction generally indicated by the arrow D. A closing member 408 of the lift check valve 400 is pressed against seat 410 of the lift check valve 400 by a spring 412. Spring 412 is retained within spring chamber 414 of the lift check valve 400. Spring force of the spring 412 keeps the lift check valve 400 closed by biasing the closing member 408 into engagement with the seat 410 until a greater force is exerted upon the closing member 408 by fluid flow 416 coming from a control line (not shown). In this example, the lift check valve 400 also includes a debris collection area 418 where debris from fluid flow 416 accumulates to prevent debris from passing through the lift check valve 400. In the depicted embodiment, the debris collection area 418 is formed as a radial space defined in part by a circumferential surface, allowing fluid communication with fluid flow 416 in the fluid passage 422 at a relatively uphole portion of the radial space. In some embodiments, the debris collection area 418 is a U-shaped tubular that is positioned at a localized low point in the fluid passage 422, and thus captures heavy objects or other debris present within fluid flow 416. Solid particulates and debris are retained in the debris collection area 418 while allowing fluid flow 416 to pass to a relatively downhole portion of the radial space towards closing member 408 of the lift check valve 400.

In this example, the spring chamber 414 of the lift check valve 400 includes a flow orifice 420 that permits fluid flow between the spring chamber 414 and a fluid passage 422 coming from the fluid inlet side 404. In use, for example, the spring chamber 414 of the lift check valve 400 can be ported to the injection fluid flow area coming from the control line. The spring chamber 414 has a primary and a redundant seal (not shown) separating the fluid flow 416 from the components positioned within the spring chamber 414. During operation, as the closing member 408 opens, fluid is forced from the spring chamber 414 into the fluid passage 422 containing fluid flow 416. The flow orifice 420 restricts fluid flow out of the spring chamber 314 according to its size and dampens opening/closing speeds of the closing member 408.

Figure 5:
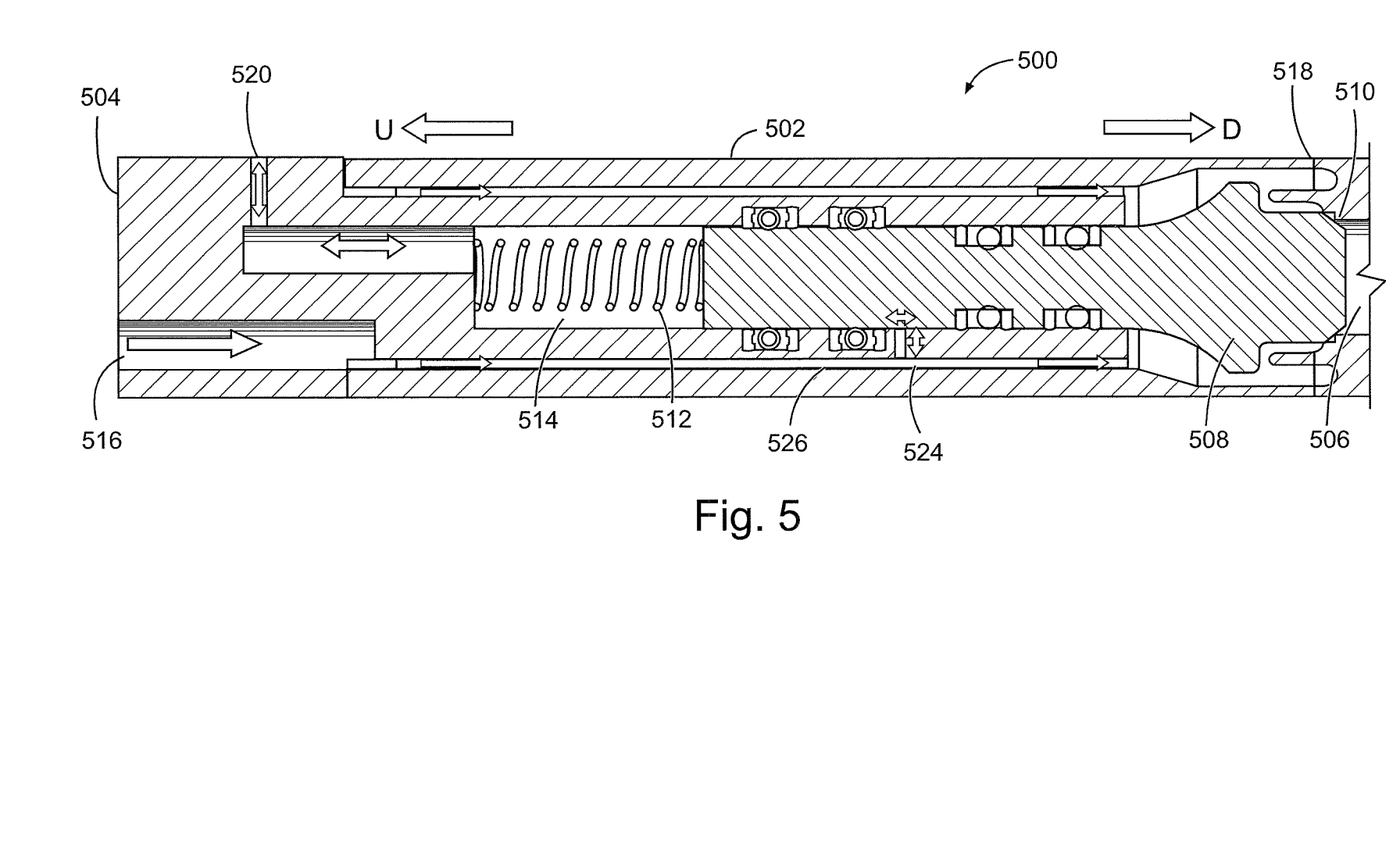
FIG. 5 illustrates a schematic diagram of a third example of a lift check valve, according to various embodiments.

FIG. 5 illustrates a schematic diagram of a third example of a lift check valve 500, according to one or more embodiments. The lift check valve 500 can be used in any check valve assembly, such as check valve assemblies 100 and 200 described above. As shown, the lift check valve 500 includes a housing 502 defining a fluid passage having a fluid inlet side 504 and a fluid outlet side 506. In use, the fluid inlet side 504 is oriented in the uphole direction generally indicated by the arrow U; the fluid outlet side 506 is oriented in the downhole direction generally indicated by the arrow D. A closing member 508 of the lift check valve 500 is pressed against seat 510 of the lift check valve 500 by a spring 512. Spring 512 is retained within spring chamber 514 of the lift check valve 500. Spring force of the spring 512 keeps the lift check valve 500 closed by biasing the closing member 508 into engagement with the seat 510 until a greater force is exerted upon the closing member 508 by fluid flow 516 coming from a control line (not shown). In this example, the lift check valve 500 also includes a debris collection area 518 where debris from fluid flow 516 accumulates to prevent debris from passing through the lift check valve 500. In the depicted embodiment, the debris collection area 518 is formed as a radial space defined in part by a circumferential surface, allowing fluid communication with fluid flow 516 in the fluid passage 526 at a relatively uphole portion of the radial space. In some embodiments, the debris collection area 518 is a U-shaped tubular that is positioned at a localized low point in the fluid passage 526, and thus captures heavy objects or other debris present within fluid flow 516. Solid particulates and debris are retained in the debris collection area 518 while allowing fluid flow 516 to pass to a relatively downhole portion of the radial space towards closing member 508 of the lift check valve 500.

In this example, the spring chamber 514 of the lift check valve 500 includes a first flow orifice 520 that permits fluid flow out of the housing 502 from the spring chamber 514. In use, for example, the spring chamber 514 of the lift check valve 500 can be ported to the annulus between well casing and borehole wall during well production. The spring chamber 514 has a primary and a redundant seal (not shown) separating annulus fluid from fluids within the housing 502. During operation, as the closing member 508 opens, fluid is forced from the spring chamber 514 out of the housing 502 and into the annulus. The flow orifice 520 restricts fluid flow out of the spring chamber 514 according to its size and dampens opening/closing speeds of the closing member 508. Further, pressure in the annulus will also counteract and reduce the impact of hydrostatic pressures of the fluid flow 516 on the cracking pressure of the lift check valve 500, allowing the closing member 508 to have a lower cracking pressure.

In this example, the spring chamber 514 of lift check valve 500 further includes a second flow orifice 524 that permits fluid flow between the spring chamber 514 and a fluid passage 526 containing fluid flow 516 coming from the fluid inlet side 504. In use, for example, the spring chamber 514 of the lift check valve 500 can be ported to the injection fluid flow area coming from the control line. The spring chamber 514 has a primary and a redundant seal (not shown) separating the fluid flow 516 from the components positioned within the spring chamber 514. During operation, as the closing member 508 opens, fluid is forced from the spring chamber 514 into the fluid passage 526 containing fluid flow 516. The second flow orifice 524 restricts fluid flow out of the spring chamber 514 according to its size and dampens opening/closing speeds of the closing member 508.

Figure 6:
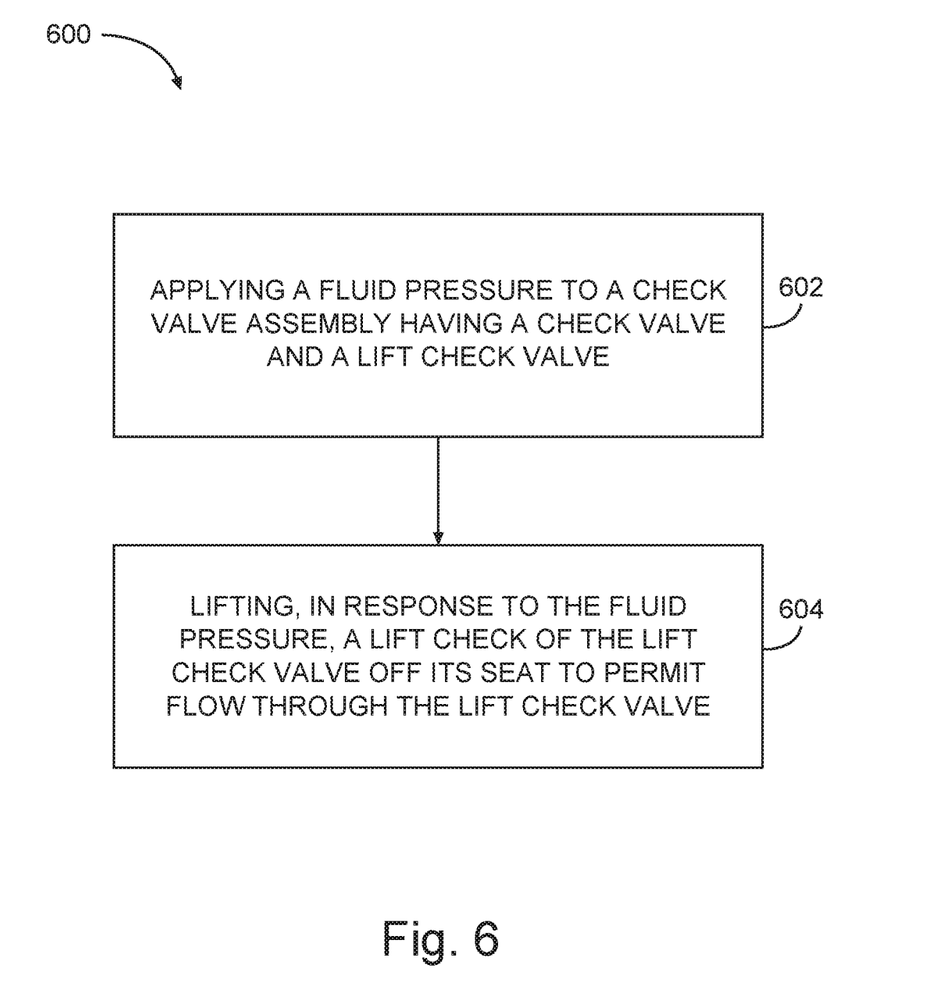
FIG. 6 illustrates a flow diagram of a method for operating a check valve assembly, according to various embodiments.

FIG. 6 illustrates a flow diagram of a method 600 for operating a check valve assembly, according to various embodiments. At operation 602, the method 600 includes applying a fluid pressure to a check valve assembly. In an example, the check valve assembly comprises a housing defining a fluid passage having a fluid inlet side and a fluid outlet side. The housing includes a first check valve positioned within the fluid passage and oriented to restrict fluid flow from the fluid outlet side. A closing member of the first check valve is pressed against a seat of the first check valve by a spring. Fluid pressure from and spring force of the spring keeps the first check valve closed by biasing the closing member into engagement with the seat until a greater force is exerted upon the closing member. The pressure at which the first check valve begins to open can be referred to as the cracking pressure, representing a minimum upstream pressure at which the first check valve will open. When the cracking pressure is reached, the first check valve will open. One of ordinary skill in the art will recognize that check valves can be designed and specified for any specific cracking pressure.

The housing further includes a second check valve positioned within the fluid passage and oriented to restrict fluid flow from the fluid inlet side. A closing member of the lift check valve is pressed against a seat of the lift check valve by a spring. The spring is retained within a spring chamber of the lift check valve. Spring force of the spring keeps the lift check valve closed by biasing the closing member of the lift check valve into engagement with the seat until a greater force is exerted upon the closing member by fluid flow. In this example, the lift check valve also includes a debris collection area where debris from fluid flow accumulates to prevent debris from passing through the lift check valve. In the depicted embodiment, the debris collection area is formed as a radial space defined in part by a circumferential surface, allowing fluid communication with fluid flow in the fluid passage at a relatively uphole portion of the radial space. In some embodiments, the debris collection area is a U-shaped tubular that is positioned at a localized low point in the fluid passage, and thus captures heavy objects or other debris present within fluid flow. Solid particulates and debris are retained in the debris collection area while allowing fluid flow to pass to a relatively downhole portion of the radial space towards closing member of the lift check valve. The check valve assembly further includes a flow dampener positioned within the housing. In one example, the flow dampener is positioned in the interior of the housing between check valve and lift check valve. In another example, the flow dampener is included structurally as a portion of the closing member of the first check valve.

At operation 604, the method 600 continues by lifting, in response to fluid pressure, the closing member off of the seat of the lift check valve to permit fluid to flow through the lift check valve. In one example, pressures associated with fluid flow coming from a control line and through the flow passage will raise the closing member off its seat, thereby opening and permitting fluid flow through the fluid passage. In other words, pressure from fluid flow actuates the closing member of the lift check valve in an uphole direction towards the fluid inlet side of the housing. The flow dampener prevents an immediate pressure drop from being created as the closing member of the lift check valve opens. Thus, the flow dampener prevents opening and closing of the lift check valve in rapid succession and prevents cavitation that would otherwise lead to pitting of the surfaces causing the lift check valve to leak. It should be noted that the cracking pressure of lift check valve is not dependent on any downhole pressures. Thus, the lift check valve cannot be opened by a negative pressure differential between control line pressure (e.g., experienced at fluid inlet side) and production tubing pressure (e.g., experienced at fluid outlet side).

Fluid flow through the fluid passage and flow dampener builds pressure until reaching a cracking pressure sufficient to push the closing member of the first check valve off its seat, thereby opening and permitting fluid flow through a fluid passage of the check valve. In other words, pressure from fluid flow actuates the closing member of the first check valve in the downhole direction D towards the fluid outlet side of the housing. It should be noted that the closing members of the two check valves actuate in opposite directions relative to each other.

The first check valve is designed to prevent the flow of fluids in an uphole direction. For example, even if production tubing pressure at the downhole, fluid outlet side falls below pressures experienced at the uphole, fluid inlet side, the first check valve can be closed via spring force. Thus, the check valve assembly should not be prematurely opened merely by encountering low downhole pressures. Opening of the check valve assembly requires sufficient pressure to be exerted from the uphole, fluid inlet side to raise the closing member of the lift check valve and push the closing member of the check valve off their respective seats. A resulting benefit is that this helps prevent the creation of a vacuum in the control line when negative pressure differentials exist.

In some embodiments, the method 600 further includes porting fluid flow from the spring chamber of the lift check valve out of the housing through a flow orifice. During operation, as the closing member of the lift check valve opens, fluid is forced from the spring chamber out of the housing. The flow orifice restricts fluid flow out of the spring chamber according to its size and dampens opening/closing speeds of the closing member. In another alternative example, the method 600 further includes porting fluid flow from the spring chamber of the lift check valve to a fluid passage at the fluid inlet side. During operation, as the closing member opens, fluid is forced from the spring chamber into the fluid passage containing fluid flow. The flow orifice restricts fluid flow out of the spring chamber according to its size and dampens opening/closing speeds of the closing member.

Figure 7:
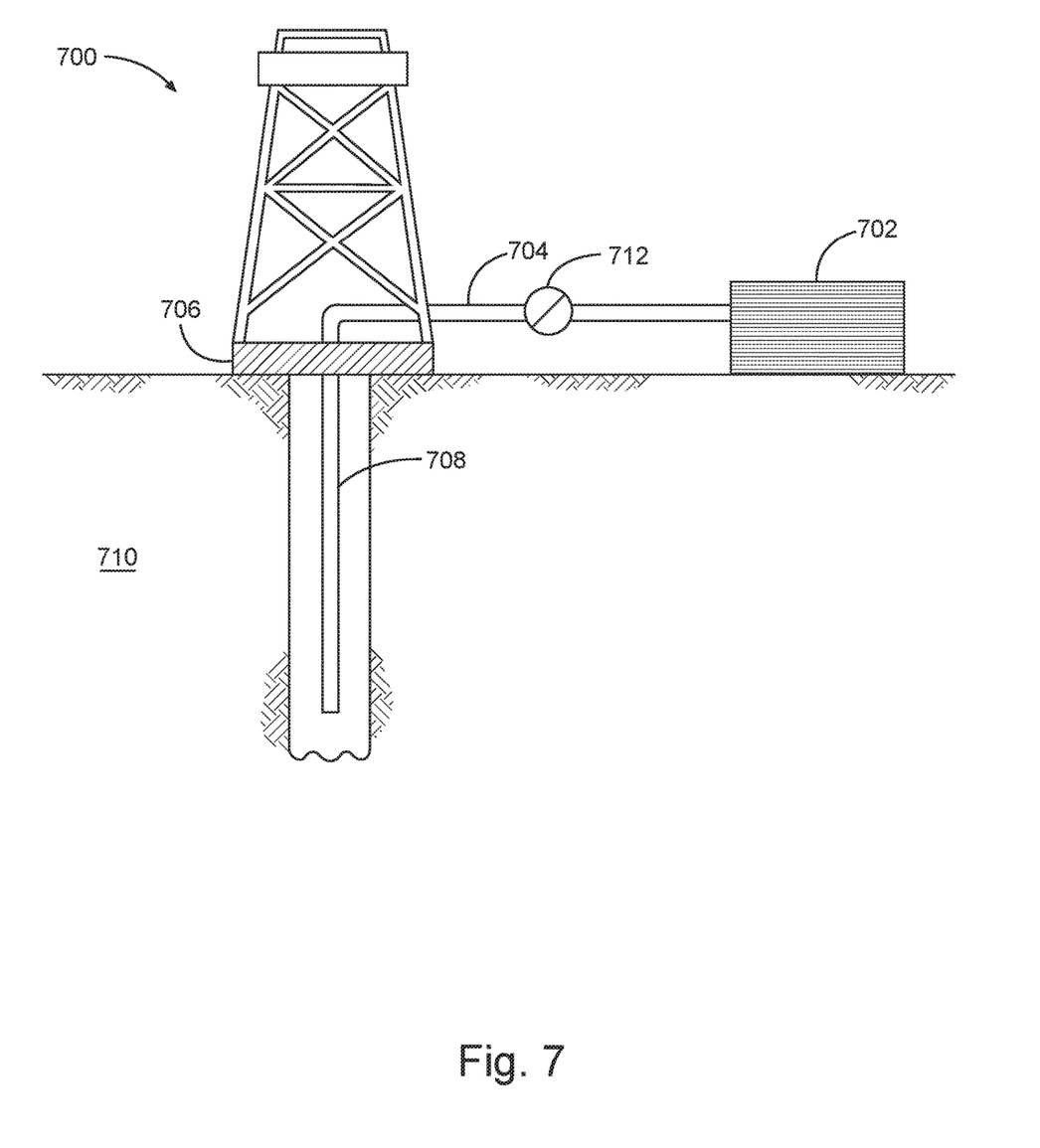
FIG. 7 illustrates a schematic diagram of systems and apparatuses that can be used with a check valve assembly, according to one or more embodiments.

FIG. 7 shows an illustrative schematic of systems and apparatuses that can be used with embodiments of the check valve assemblies of the present invention to inject fluids to subterranean locations, according to one or more embodiments. As depicted in FIG. 7, system or apparatus 700 can include tank 702, in which fluids (e.g., injection fluids) can be stored or formulated. In some embodiments, the tank can be a mixing tank. The fluids can be conveyed via line 704 to wellhead 706, where the fluids enters tubular 708, with tubular 708 extending from wellhead 708 into subterranean formation 710. Upon being ejected from tubular 708, the fluids can subsequently be introduced into production tubing (not shown) or penetrate into subterranean formation 710. Pump 712 can be configured to raise the pressure of the fluids to a desired degree before its introduction into tubular 708. It is to be recognized that system or apparatus 700 is merely exemplary in nature and various additional components can be present that have not necessarily been depicted in FIG. 7 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 7, at least part of the fluids can, in some embodiments, flow back to wellhead 706 and exit subterranean formation 710. In some embodiments, the fluids that have flowed back to wellhead 706 can subsequently be recovered, and in some examples reformulated, and recirculated to subterranean formation 710.

It is also to be recognized that the disclosed fluids and check valve assemblies can also directly or indirectly affect the operation of various downhole or subterranean equipment and tools that can come into contact with the fluids and check valve assemblies during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 7.

For purposes of illustration, the example of FIG. 7 shows a vertically-oriented borehole configuration. However, the apparatus and techniques described herein may also be used in other borehole configurations, such as a borehole including a horizontal penetration direction, or an oblique borehole configuration, for example. It should also be noted that while FIG. 7 generally depicts a land-based system or apparatus, it is to be recognized that like systems and apparatuses can be operated in subsea locations as well. Embodiments of the present invention can have a different scale than that depicted in FIG. 7.

In summary, various embodiments permit the cracking pressures of check valve assemblies to be determined without overtly considering low production tubing pressure that might lead to premature opening of prior art check valve assemblies. Instead, rather than opening the check valve assembly, low pressure experienced downhole operation of the lift check valve should function to increase the pressure holding the closing member against its seat, providing an improved seal. In this way, the inadvertent creation of a vacuum in the line can be avoided. In embodiments having flow orifices serving as fluid communication ports out of the spring chamber, the flow orifices can reduce the speed at which the check valve assemblies open and close. Flow orifices between the spring chamber and the annulus permit the annulus pressure to offset hydrostatic pressures of injection fluids and keep the check valve assemblies from opening prematurely. This improves the reliability of seals when the checks are closed, reducing chances of chattering that can cause damage and leakage. By reducing leakage and subsequent vacuum creation, the lift and reliability of control lines, valves, and mandrels can be increased.

To better illustrate the apparatuses and methods for regulating fluid flow and pressure in chemical injection systems disclosed herein, a non-limiting list of examples is provided. The following numbered examples are illustrative embodiments in accordance with various aspects of the present disclosure.

1. A check valve assembly may include a housing defining a fluid passage having a fluid inlet side and a fluid outlet side; a first check valve positioned within the fluid passage oriented to restrict fluid flow from the fluid inlet side; a second check valve positioned within the fluid passage oriented to restrict fluid flow from the fluid outlet side; and a flow dampener positioned within the fluid passage and between the first and second check valves.

2. The check valve assembly of example 1, in which the first check valve further includes a debris collection area formed as a radial space defined in part by a circumferential inner surface of the fluid passage.

3. The check valve assembly of any of the preceding examples, in which the flow dampener is positioned within an interior of the housing between the first check valve and the second check valve.

4. The check valve assembly of any of the preceding examples, in which the flow dampener is included as an integral portion of a closing member of the check valve.

5. The check valve assembly of any of the preceding examples, in which the first check valve includes at least one of: a first flow orifice to permit fluid flow out of the housing from a spring chamber of the first check valve; or a second flow orifice to permit fluid flow between the spring chamber and a fluid passage at the fluid inlet side.

6. The check valve assembly of any of the preceding examples, in which an actuation direction of the first check valve is opposite that of the second check valve.

7. The check valve assembly of any of the preceding examples, in which the first check valve further includes a spring that biases a closing member into engagement with a seat of the first check valve.

8. The check valve assembly of any of the preceding examples, in which the first check valve further includes a fluid passage that is selectively opened and closed by movement of a closing member of the first check valve.

9. The check valve assembly of any of the preceding examples, in which the closing member is moveable in response to fluid pressure to open the fluid passage by lifting the closing member off of a seat of the first check valve.

10. The check valve assembly of any of the preceding examples, in which the second check valve further includes a fluid passage that is selectively opened and closed by movement of a closing member of the second check valve.

11. The check valve assembly of any of the preceding examples, in which the closing member is moveable in response to fluid pressure to open the fluid passage by pushing the closing member away from a seat of the second check valve.

12. A method includes applying fluid pressure to a check valve assembly including a housing defining a fluid passage having a fluid inlet side and a fluid outlet side, a first check valve positioned within the fluid passage oriented to restrict fluid flow from the fluid inlet side, and a second check valve positioned within the fluid passage oriented to restrict fluid flow from the fluid outlet side; and lifting, in response to the fluid pressure, a closing member off of a seat of the first check valve to permit fluid to flow through the first check valve.

13. The method of example 12, in which lifting the closing member includes moving the closing member towards the fluid inlet side of the housing.

14. The method of either of examples 12 or 13, in which fluid flowing through the first check valve at a selected pressure will result in pushing a second closing member off a seat of the second check valve to permit fluid to flow through the second check valve.

15. The method of any of examples 12-14, in which pushing the second closing member includes moving the second closing member towards the fluid outlet side of the housing.

16. The method of any of examples 12-15, further including porting fluid flow through a flow orifice to permit fluid flow from a spring chamber of the first check valve to out of the housing, in which fluid flow is transported out of the spring chamber as the closing member is moved.

17. The method of any of examples 12-16, further including porting fluid flow through a flow orifice to permit fluid flow from a spring chamber of the first check valve to a fluid passage at the fluid inlet side, in which fluid flow is transported out of the spring chamber as the closing member is moved.

18. The method of any of examples 12-17, further including porting fluid flow through a first flow orifice to permit fluid flow from a spring chamber of the first check valve to out of the housing, in which fluid flow is transported out of the spring chamber as the closing member is moved, and porting fluid flow through a second flow orifice to permit fluid flow from the spring chamber of the first check valve to a fluid passage at the fluid inlet side, in which fluid flow is transported out of the spring chamber as the closing member is moved.

19. The method of any of examples 12-18, in which the closing member is biased against the seat of the first check valve using a spring.

20. The method of any of examples 12-19, in which pressure holding the closing member against the seat increases as pressure on the fluid outlet side of the housing decreases.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The embodiments are submitted with the understanding that they will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A check valve assembly, comprising:
   a housing defining a fluid passage having a fluid inlet side and a fluid outlet side;
   a first check valve positioned within the fluid passage oriented to restrict fluid flow from the fluid inlet side;
   a second check valve positioned within the fluid passage oriented to restrict fluid flow from the fluid outlet side; and
   a flow dampener positioned within the fluid passage such that the flow dampener moves to control pressure within the fluid passage to control the opening and closing speed of the first check value.

2. The check valve assembly of claim 1, wherein the first check valve further comprises a debris collection area formed as a radial space defined in part by a circumferential inner surface of the fluid passage.

3. The check valve assembly of claim 1, wherein the flow dampener is positioned within an interior of the housing between the first check valve and the second check valve.

4. The check valve assembly of claim 1, wherein the flow dampener is included as an integral portion of a closing member of the second check valve.

5. The check valve assembly of claim 1, wherein the first check valve includes at least one of a first flow orifice to permit fluid flow out of the housing from a spring chamber of the first check valve, or a second flow orifice to permit fluid flow between the spring chamber and a second fluid passage at the fluid inlet side.

6. The check valve assembly of claim 1, wherein an actuation direction of the first check valve is opposite that of the second check valve.

7. The check valve assembly of claim 1, wherein the first check valve further comprises a spring that biases a closing member into engagement with a seat of the first check valve.

8. The check valve assembly of claim 1, wherein the first check valve further comprises a first check valve fluid passage that is selectively opened and closed by movement of a closing member of the first check valve.

9. The check valve assembly of claim 8, wherein the closing member is moveable in response to fluid pressure to open the first check valve fluid passage by lifting the closing member off of a seat of the first check valve.

10. The check valve assembly of claim 1, wherein the second check valve further comprises a second check valve fluid passage that is selectively opened and closed by movement of a closing member of the second check valve.

11. The check valve assembly of claim 10, wherein the closing member is moveable in response to fluid pressure to open the second check valve fluid passage by pushing the closing member away from a seat of the second check valve.

12. A method, comprising:
   applying fluid pressure to a check valve assembly comprising a housing defining a fluid passage having a fluid inlet side and a fluid outlet side, a first check valve positioned within the fluid passage oriented to restrict fluid flow from the fluid inlet side, and a second check valve positioned within the fluid passage oriented to restrict fluid flow from the fluid outlet side;
   lifting, in response to the fluid pressure, a closing member off of a seat of the first check valve to permit fluid to flow through the first check valve; and
   controlling the pressure within the fluid passage by moving a flow dampener to control the opening and closing speed of the first check value.

13. The method of claim 12, wherein lifting the closing member comprises moving the closing member towards the fluid inlet side of the housing.

14. The method of claim 12, wherein fluid flowing through the first check valve at a selected pressure will result in pushing a second closing member off a seat of the second check valve to permit fluid to flow through the second check valve.

15. The method of claim 14, wherein pushing the second closing member comprises moving the second closing member towards the fluid outlet side of the housing.

16. The method of claim 12, further comprising porting fluid flow through a flow orifice to permit fluid flow from a spring chamber of the first check valve to out of the housing, wherein fluid flow is transported out of the spring chamber as the closing member is moved.

17. The method of claim 12, further comprising porting fluid flow through a flow orifice to permit fluid flow from a spring chamber of the first check valve to the fluid passage at the fluid inlet side, wherein fluid flow is transported out of the spring chamber as the closing member is moved.

18. The method of claim 12, further comprising:
   porting fluid flow through a first flow orifice to permit fluid flow from a spring chamber of the first check valve to out of the housing, wherein fluid flow is transported out of the spring chamber as the closing member is moved, and
   porting fluid flow through a second flow orifice to permit fluid flow from the spring chamber of the first check valve to the fluid passage at the fluid inlet side, wherein fluid flow is transported out of the spring chamber as the closing member is moved.

19. The method of claim 12, wherein the closing member is biased against the seat of the first check valve using a spring.

20. The method of claim 19, wherein pressure holding the closing member against the seat increases as pressure on the fluid outlet side of the housing decreases.

* * * * *